United States Patent
Youso et al.

(10) Patent No.: US 10,837,380 B2
(45) Date of Patent: Nov. 17, 2020

(54) COMPRESSION IGNITION GASOLINE ENGINE

(71) Applicant: Mazda Motor Corporation, Hiroshima (JP)

(72) Inventors: Takashi Youso, Hiroshima (JP); Takashi Kaminaga, Hiroshima (JP); Masahisa Yamakawa, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 16/465,988

(22) PCT Filed: Dec. 1, 2016

(86) PCT No.: PCT/JP2016/085695
§ 371 (c)(1),
(2) Date: May 31, 2019

(87) PCT Pub. No.: WO2018/100707
PCT Pub. Date: Jun. 7, 2018

(65) Prior Publication Data
US 2019/0309696 A1    Oct. 10, 2019

(51) Int. Cl.
*F02D 41/00*    (2006.01)
*F02D 41/30*    (2006.01)
(Continued)

(52) U.S. Cl.
CPC .......... *F02D 41/005* (2013.01); *F02D 13/02* (2013.01); *F02D 41/3035* (2013.01);
(Continued)

(58) Field of Classification Search
CPC ........ F02D 41/00; F02D 41/005; F02D 13/02; F02D 41/3035; F02D 45/00; F02D 2201/165; F02M 26/01; Y02T 10/128
See application file for complete search history.

(56) References Cited

U.S. PATENT DOCUMENTS 9,650,984 B2 *   5/2017   Nagatsu .............. F02D 13/0265
2002/0053336 A1  5/2002   Nogi et al.
(Continued)

FOREIGN PATENT DOCUMENTS

DE   102013013527 A1   3/2014
DE   102013013619 A1   3/2014
(Continued)

OTHER PUBLICATIONS

Shibata, G., "Firing index of the fuel," Engine Review, vol. 3, No. 3, Jul. 1, 2013, 28 pages. Submitted with partial English translation.
(Continued)

*Primary Examiner* — Hieu T Vo
(74) *Attorney, Agent, or Firm* — Alleman Hall Creasman & Tuttle LLP

(57) ABSTRACT

A compression ignition gasoline engine includes a fuel injection valve for injecting fuel containing gasoline as a main component into a cylinder; an EGR device operative to perform high-temperature EGR of introducing burnt gas generated in the cylinder into the cylinder at a high temperature; and a combustion control unit for controlling the fuel injection valve and the EGR device in such a way that HCCI combustion in which fuel injected from the fuel injection valve self-ignites within the cylinder occurs. The combustion control unit controls the EGR device, in at least a partial load operating range in which HCCI combustion is performed, in such a way that the EGR rate increases, as compared with a low load condition, in a high load condition in which G/F being a ratio between a total amount of gas and a fuel amount within the cylinder decreases.

3 Claims, 11 Drawing Sheets

(51) Int. Cl.
*F02D 13/02* (2006.01)
*F02M 26/01* (2016.01)
*F02D 45/00* (2006.01)
*F02D 1/16* (2006.01)

(52) U.S. Cl.
CPC ............ *F02D 45/00* (2013.01); *F02M 26/01* (2016.02); *F02D 2001/165* (2013.01); *Y02T 10/12* (2013.01)

(56) References Cited

U.S. PATENT DOCUMENTS

| | | |
|---|---|---|
| 2009/0248271 A1 | 10/2009 | Kuzuyama et al. |
| 2013/0213349 A1 | 8/2013 | Sellnau et al. |
| 2014/0060489 A1 | 3/2014 | Iwai et al. |
| 2014/0060490 A1 | 3/2014 | Iwai et al. |
| 2014/0060493 A1 | 3/2014 | Iwai et al. |
| 2015/0083072 A1 | 3/2015 | Nagatsu et al. |

FOREIGN PATENT DOCUMENTS

| | | |
|---|---|---|
| JP | 2001003800 A | 1/2001 |
| JP | 2004076736 A | 3/2004 |
| JP | 2005061323 A | 3/2005 |
| JP | 2010038012 A | 2/2010 |
| JP | 2014047643 A | 3/2014 |
| JP | 2015001156 A | 1/2015 |
| JP | 2016044670 A | 4/2016 |
| WO | 2012058280 A2 | 5/2012 |

OTHER PUBLICATIONS

Japan Patent Office, Office Action Issued in Application No. 2018553596, dated Feb. 12, 2020, 10 pages.
European Patent Office, Extended European Search Report Issued in Application No. 16922576.0, dated Sep. 23, 2019, Germany, 10 pages.

* cited by examiner

ENGINE SPECIFICATION AND OPERATING CONDITION

| VALVE DRIVING | HYDRAULICALLY VARIABLE TYPE (4 VALVES) |
|---|---|
| BORE × STROKE (mm) | 87.5 × 83.1 |
| COMPRESSION RATIO | 20 |
| COMBUSTION CHAMBER | PENT-ROOF TYPE |
| FUEL SUPPLY | DIRECT INJECTION TYPE |
| ENGINE ROTATION NUMBER(rpm) | 1000 |
| INTAKE TEMPERATURE | 50 |
| COOLING WATER/OIL TEMPERATURE (°C) | 88 / 90 |

FIG. 4

CHARACTERISTICS OF SAMPLE FUELS

| | | Para90 | Arom30 | Arom20 | Arom30-Ole20 | Arom30-Naph20 | ETBE20 | EtOH20 |
|---|---|---|---|---|---|---|---|---|
| RON | | 91.2 | 90.1 | 90.6 | 91.0 | 90.1 | 91.5 | 91.4 |
| MON | | 89.8 | 85.0 | 86.7 | 82.7 | 83.8 | 89.3 | 86.8 |
| SENSITIVITY | | 1.4 | 5.1 | 3.9 | 8.3 | 6.3 | 2.2 | 4.6 |
| DENSITY | 15°C g/cm³ | 0.693 | 0.732 | 0.719 | 0.734 | 0.749 | 0.705 | 0.713 |
| VISCOSITY | 30°C mm²/s | 0.624 | 0.534 | 0.529 | 0.512 | 0.551 | 0.560 | 0.668 |
| SURFACE TENSION | 25°C mN/m | 18.7 | 19.6 | 19.5 | 19.8 | 20.8 | 18.4 | 18.9 |
| COMPONENT RATIO (vol%) | NORMAL PARAFFIN | 4.0 | 12.4 | 6.6 | 4.4 | 7.0 | 9.0 | 13.7 |
| | ISO-PARAFFIN | 96.0 | 58.1 | 72.8 | 46.3 | 43.8 | 70.7 | 65.4 |
| | OLEFIN | 0.0 | 0.0 | 0.0 | 20.5 | 0.0 | 0.2 | 0.0 |
| | NAPHTHENE | 0.0 | 0.1 | 0.1 | 0.1 | 19.9 | 0.0 | 0.1 |
| | AROMATICS | 0.0 | 29.4 | 20.4 | 28.7 | 29.2 | 0.0 | 0.0 |
| | BENZENE | 0.0 | 0.0 | 0.0 | 0.0 | 0.0 | 0.0 | 0.0 |
| | ETBE | 0.0 | 0.0 | 0.0 | 0.0 | 0.0 | 19.3 | 0.0 |
| | EtOH | 0.0 | 0.0 | 0.0 | 0.0 | 0.0 | 0.5 | 20.8 |

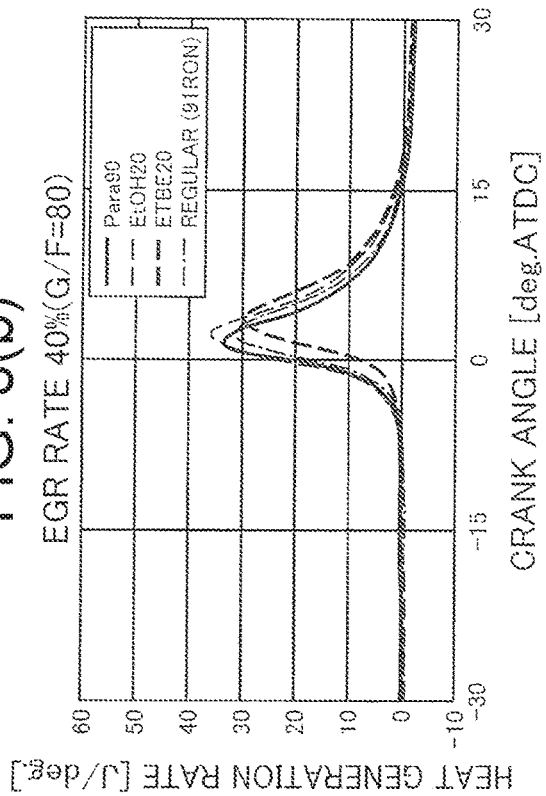
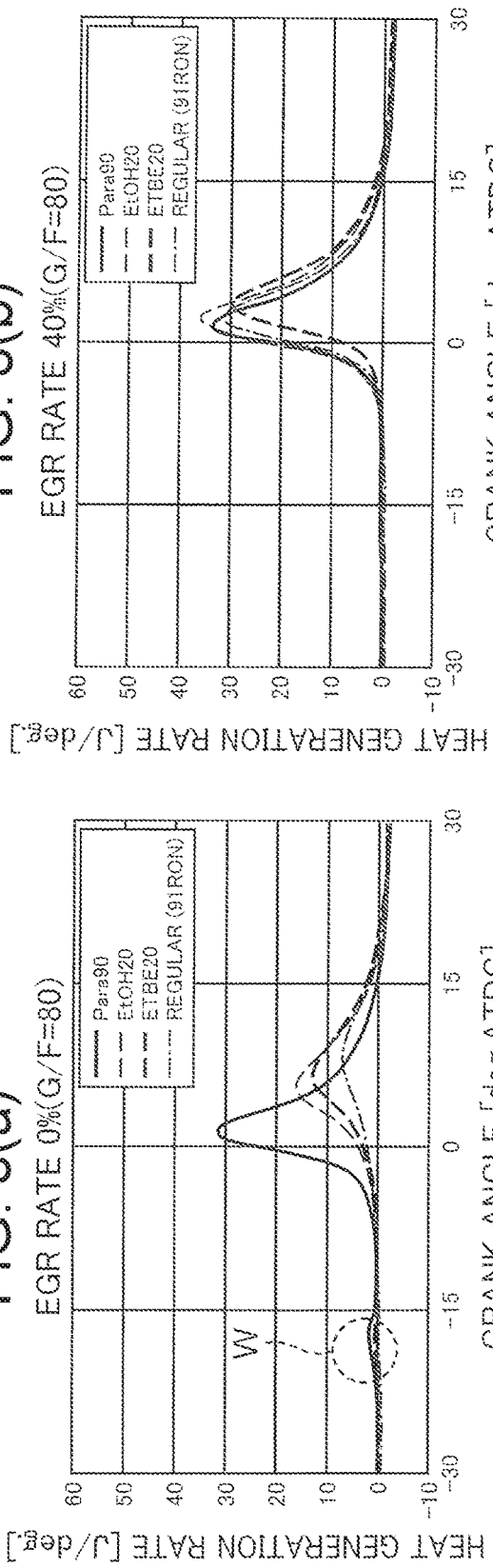
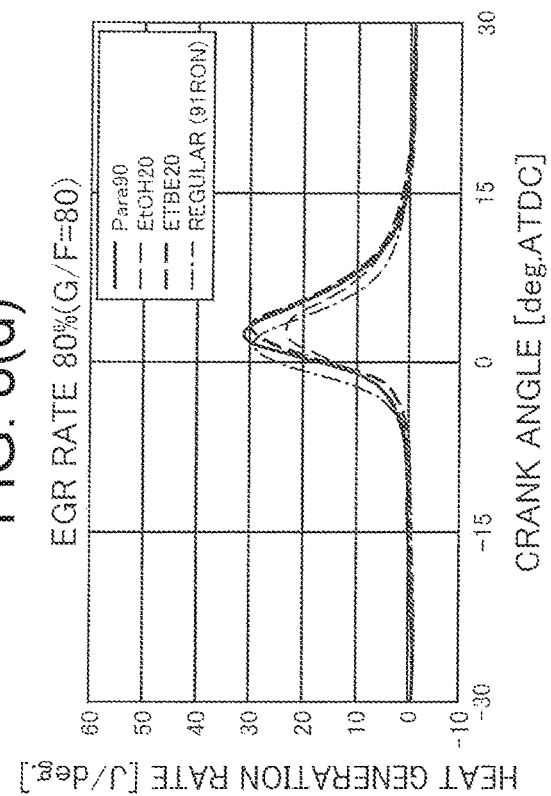
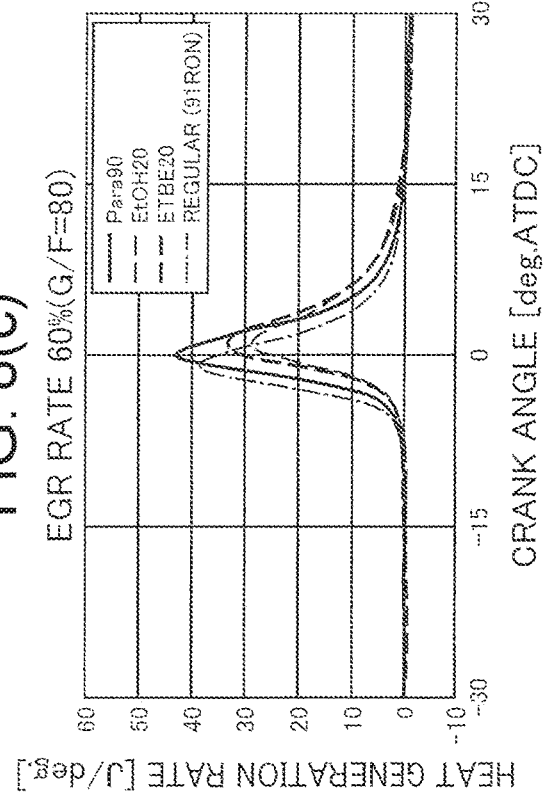

COMPRESSION IGNITION GASOLINE ENGINE

TECHNICAL FIELD

The present invention relates to a compression ignition gasoline engine for combusting fuel containing gasoline as a main component within a cylinder by self-ignition.

BACKGROUND ART

An engine as disclosed in Patent Literature 1 is known as an example of a compression ignition gasoline engine as described above. In the engine of Patent Literature 1, HCCI combustion is performed in a predetermined operating range except for high load. Further, when the HCCI combustion is performed, internal EGR of letting burnt gas remain (flow back) in a cylinder is performed, and an EGR rate of the internal EGR (a ratio of EGR gas with respect to a total amount of gas to be introduced into a cylinder) is controlled to decrease, as load increases. Thus, fuel self-ignition is promoted, while suppressing combustion noise.

Herein, it is said that HCCI combustion is likely to be affected by a difference in fuel component (molecular structure), since HCCI combustion is combustion, which occurs by spontaneous reaction of fuel (gasoline) with oxygen in a high-temperature and high-pressure environment. In view of the above, even if gasoline having an equivalent octane number is supplied to a cylinder, it is presumed that an ignition timing may vary due to a difference in fuel component.

Regarding this point, the inventors of the present application found, as a result of earnest research, an ignition timing variation due to a difference in fuel component is likely to occur, when an operating condition of an engine is a condition accompanying a low-temperature oxidation reaction of fuel. Therefore, in order to perform appropriate HCCI combustion, it is desired to control an operating condition in such a way that a low-temperature oxidation reaction does not occur as much as possible. However, in Patent Literature 1, since an EGR rate or the like is not controlled in terms of suppressing a low-temperature oxidation reaction as described above, an ignition timing may vary due to a difference in fuel component.

CITATION LIST

Patent Literature

Patent Literature 1: Japanese Unexamined Patent Application Publication No. 2014-47643

SUMMARY OF INVENTION

In view of the above, an object of the present invention is to provide a compression ignition gasoline engine capable of suppressing an ignition timing variation due to a difference in fuel component.

As a means for solving the above issue, a compression ignition gasoline engine according to the present invention includes: a cylinder for accommodating a piston to be reciprocally movable; a fuel injection valve for injecting fuel containing gasoline as a main component into the cylinder; an EGR device operative to perform high-temperature EGR of introducing burnt gas generated in the cylinder into the cylinder at a high temperature; and a combustion control unit for controlling the fuel injection valve and the EGR device in such a way that HCCI combustion in which fuel injected from the fuel injection valve self-ignites within the cylinder occurs. The combustion control unit controls the EGR device in such a way that, in at least a partial load operating range in which HCCI combustion is performed, an EGR rate increases, as compared with a low load condition, in a high load condition in which G/F being a ratio between a total amount of gas and a fuel amount within the cylinder decreases.

According to the present invention, since it is possible to suppress an ignition timing variation due to a difference in fuel component, the present invention is advantageous in performing appropriate HCCI combustion, while allowing use of various types of fuels having different components.

BRIEF DESCRIPTION OF DRAWINGS

FIG. 4 is a table illustrating characteristics of a plurality of sample fuels used in the experiment.

FIGS. 8(a) to 8(d) are graphs illustrating a heat generation rate for each EGR rate condition, when a plurality of others types of fuels selected from among the sample fuels are respectively HCC combusted.

DESCRIPTION OF EMBODIMENTS

(1) Description on Embodiment

(1-1) Overall Configuration of Engine

Figure 1:
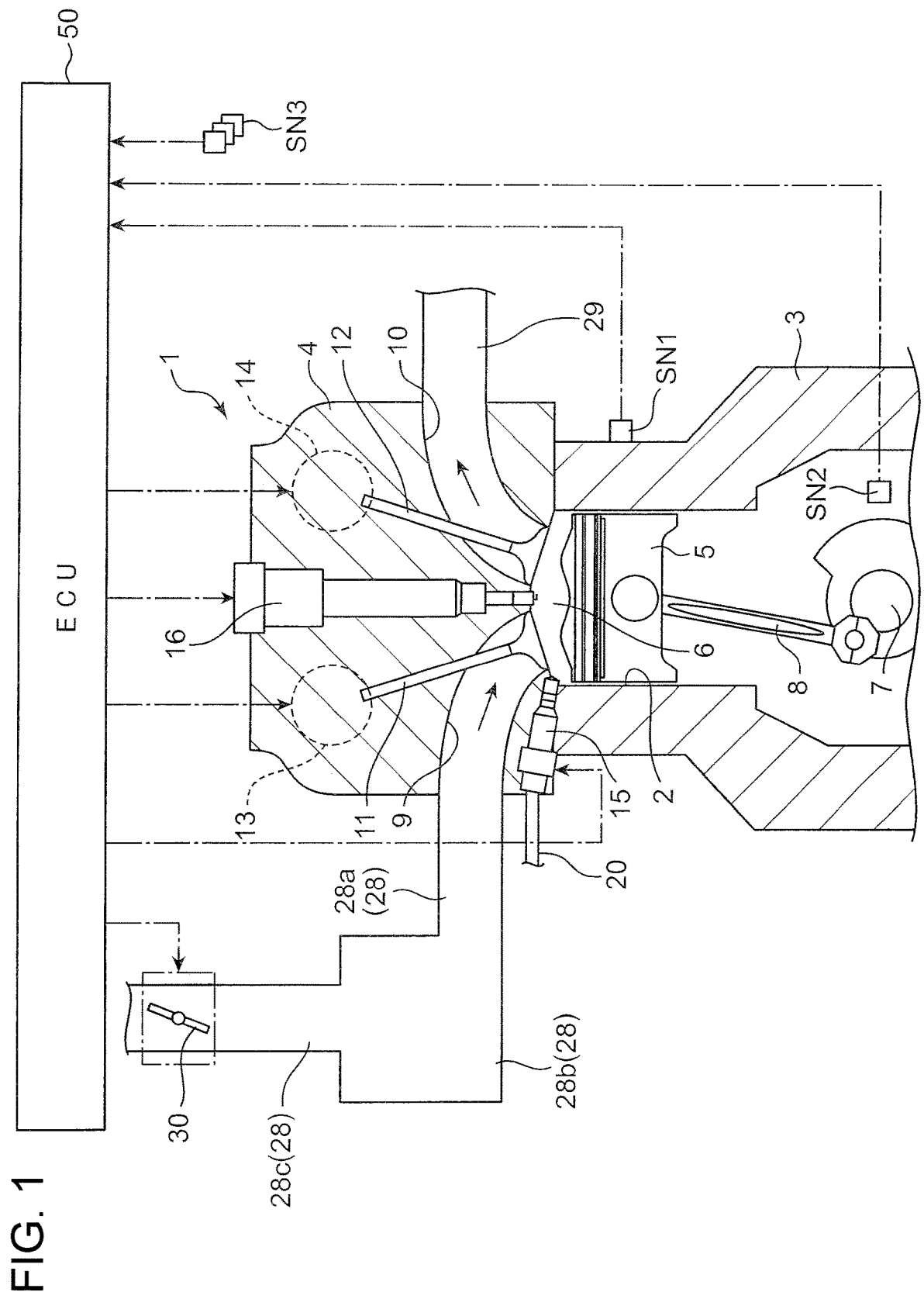
FIG. 1 is a system diagram schematically illustrating an overall configuration of a compression ignition gasoline engine according to an embodiment of the present invention.

FIG. 1 is a system diagram schematically illustrating an overall configuration of a compression ignition gasoline engine according to an embodiment of the present invention. The engine illustrated in FIG. 1 is a 4-cycle multi-cylinder gasoline engine to be mounted in a vehicle, as a power source for driving. An engine body 1 of the engine is of a so-called in-line 4-cylinder type; and includes a cylinder block 3 having four cylinders 2 aligned in a row in a direction orthogonal to the plane of FIG. 1, a cylinder head 4 disposed on a top surface of the cylinder block 3 in such a way as to close the cylinders 2 from above, and a piston 5 that is received in each cylinder 2 to be reciprocally movable.

A combustion chamber 6 is formed above the piston 5. Fuel containing gasoline as a main component is supplied to the combustion chamber 6 by injection from a fuel injection valve 15 to be described later. Injected fuel is mixed with air, self-ignites in the combustion chamber 6, which undergoes high temperature and high pressure by compressing action of the piston 5, and is combusted. The piston reciprocally moves in an up-down direction when receiving an expanding force (depressing force) accompanied by the combustion.

Combustion by self-ignition, while mixing fuel with air as described above is called homogeneous charge compression ignition combustion (HCCI combustion). In order to perform the HCCI combustion, it is necessary to raise an internal temperature of the cylinder 2 to a sufficiently high temperature at a point of time when the piston 5 reaches a compression top dead center. In view of the above, in the present embodiment, a geometric compression ratio of each cylinder 2, namely, a ratio between the volume of the combustion chamber 6 when the piston 5 is at a top dead center, and the volume of the combustion chamber 6 when the piston 5 is at a bottom dead center is set to be not smaller than 18 but not larger than 22.

A crankshaft 7 being an output shaft of the engine body 1 is disposed below the piston 5. The crankshaft 7 is connected to the piston 5 via a connecting rod 8, and is driven and rotated around a central axis thereof, as the piston 5 reciprocally moves (up-down movement).

The fuel injection valve 15 is disposed in the cylinder head 4 for each cylinder 2. A fuel supply pipe 20 is connected to each of the fuel injection valves 15. Each fuel injection valve 15 supplies fuel of a required amount to each cylinder 2 by injecting fuel supplied from the fuel supply pipe 20 into the combustion chamber 6 by high-pressure injection.

Herein, an engine of the present embodiment is basically able to perform HCCI combustion in all operating ranges. However, in a condition that HCCI combustion is difficult such as in a cold state in which an engine water temperature is low, spark ignition combustion (SI combustion) in which a mixture of fuel and air (air-fuel mixture) is ignited is performed. In view of the above, a spark plug 16 for igniting the air-fuel mixture when SI combustion is performed is disposed in the cylinder head 4 for each cylinder 2.

A water temperature sensor SN1 and a crank angle sensor SN2 are disposed in the cylinder block 3. The water temperature sensor SN1 is a sensor for detecting a temperature (engine water temperature) of cooling water flowing through an unillustrated water jacket, which is formed inside the engine body 1. The crank angle sensor SN2 is a sensor for detecting a rotating angle (crank angle) of the crankshaft 7, and a rotation number (engine rotation number) of the crankshaft 7.

An intake port 9 and an exhaust port 10, each of which is opened in the combustion chamber 6 of each cylinder 2, and an intake valve 11 and an exhaust valve 12 for opening and closing the ports 9 and 10 are provided in the cylinder head 4. The intake valve 11 and the exhaust valve 12 are driven to open and close in association with rotation of the crankshaft 7 by a valve mechanism including a pair of camshafts disposed in the cylinder head 4.

Each of an intake passage 28 and an exhaust passage 29 is connected to the cylinder head 4. The intake passage 28 is adapted to introduce air (fresh air) drawn from the outside into the combustion chamber 6, and is connected to one lateral surface of the cylinder head 4 in such a way as to communicate with the intake port 9. The exhaust passage 29 is adapted to discharge burnt gas (exhaust gas) generated in the combustion chamber 6 to the outside, and is connected to the other lateral surface of the cylinder head 4 in such a way as to communicate with the exhaust port 10.

A portion of the intake passage 28 from a position corresponding to the engine body 1 to an upstream position away from the engine body 1 by a predetermined distance is formed into branch passage portions 28a, each of which is branched for each cylinder 2. Upstream ends of the branch passage portions 28a are respectively connected to a surge tank 28b, which is common to the branch passage portions 28a. A common passage portion 28c of a single tubular shape is formed on an upstream side with respect to the surge tank 28b.

An openable/closable throttle valve 30 for adjusting an intake air amount into each cylinder 2 is provided in the common passage portion 28c.

A lift variable mechanism 13 capable of continuously (non-stepwisely) changing a lift amount of the intake valve 11 is incorporated in a valve mechanism for the intake valve 11. A type of the lift variable mechanism 13 is not limited, as far as it is possible to change the lift amount. However, for example, the lift variable mechanism may include a link mechanism for reciprocally and pivotally moving a cam for driving the intake valve 11 in association with rotation of a camshaft, a control arm for variably setting a disposition (lever ratio) of the link mechanism, and an actuator for changing a pivot amount of the cam (an amount of depressing the intake valve 11) by driving the control arm. Note that the lift variable mechanism 13 in the present embodiment is a variable mechanism of a type such that a valve timing (at least one of a valve open timing and a valve close timing) is changed accompanied by a change in lift amount.

An opening/closing switching mechanism 14 for validating or invalidating a function of depressing the exhaust valve 12 during an intake stroke is incorporated in a valve mechanism for the exhaust valve 12. Specifically, the opening/closing switching mechanism 14 has a function of opening the exhaust valve 12 not only in an exhaust stroke but also in an intake stroke, and switching whether a valve opening operation of the exhaust valve 12 in the intake stroke is performed or stopped. The opening/closing switching mechanism 14 may include, for example, a sub cam for depressing the exhaust valve 12 in an intake stroke, independently of an ordinary cam for driving the exhaust cam 12 (i.e. a cam for depressing the exhaust valve 12 in an exhaust stroke), and a so-called lost motion mechanism for cancelling transmission of a driving force of the sub cam to the exhaust valve 12.

Disposing the lift variable mechanism 13 and the opening/closing switching mechanism 14 in an engine of the present embodiment enables to perform internal EGR, which is an operation of letting burnt gas remain in the cylinder 2, and enables to adjust an EGR rate, which is a ratio of burnt gas to be introduced by the internal EGR with respect to a total amount of gas within the cylinder 2. Specifically, when the opening/closing switching mechanism 14 is driven in such a way as to validate opening of the exhaust valve 12 in an intake stroke, a part of burnt gas discharged from the cylinder 2 into the exhaust port 10 flows back to the cylinder 2. Thus, high-temperature burnt gas before being discharged to the exhaust passage 29 is drawn back to the cylinder 2 (in other words, substantially remains in the cylinder 2), and internal EGR is performed. Further, a lift amount/valve timing of the intake valve 11 is changed by the lift variable mechanism 13, and accordingly, an amount of air (fresh air) to be introduced to the cylinder 2 is changed. Thus, an EGR rate is adjusted. In this way, the lift variable mechanism 13 and the opening/closing switching mechanism 14 constitute a valve variable mechanism for performing internal EGR and adjusting an EGR rate thereof, and corresponds to an example of an "EGR device" in the claims.

(1-2) Control System

The units of the engine configured as described above are integrally controlled by an engine control unit (ECU) 50. As is well-known, the ECU 50 is a microprocessor constituted by a CPU, an ROM, an RAM, and the like; and corresponds to a "combustion control unit" in the claims.

Various pieces of information are input to the ECU 50 from various types of sensors provided in the engine. Specifically, the ECU 50 is electrically connected to the water temperature sensor SN1 and the crank angle sensor SN2, and acquires various pieces of information such as an engine water temperature, a crank angle, and an engine rotation number, based on an input signal from each of the sensors SN1 and SN2.

Further, a vehicle-mounted sensor SN3 for detecting various pieces of information such as a traveling speed (vehicle speed) of a vehicle, and an opening angle (accelerator opening angle) of an accelerator pedal is disposed in the units of a vehicle, for example. The vehicle-mounted sensor SN3 is also electrically connected to the ECU 50. The ECU 50 acquires various pieces of information relating to a vehicle, such as a vehicle speed and an accelerator opening angle, based on an input signal from the vehicle-mounted sensor SN3.

The ECU 50 controls the units of the engine, while performing various calculations, based on information to be acquired from the sensors SN1 to SN3. Specifically, the ECU 50 is electrically connected to the lift variable mechanism 13, the opening/closing switching mechanism 14, the fuel injection valve 15, the spark plug 16, the throttle valve 30, and the like; and outputs a signal for controlling these pieces of equipment, respectively, based on a result of the calculations, and the like.

A more specific function of the ECU 50 is described. During operation of the engine, the ECU 50 determines whether either of HCCI combustion and SI combustion is to be performed, based on an engine water temperature detected by the water temperature sensor SN1, for example. Specifically, when an engine water temperature is lower than a predetermined value (cold state), SI combustion is selected; and when an engine water temperature is equal to or higher than the predetermined value (warm state), HCCI combustion is selected.

Further, the ECU 50 specifies an engine load (required torque), based on a vehicle speed, an accelerator opening angle, and the like detected by the vehicle-mounted sensor SN3, and specifies an engine rotation number, based on a change in crank angle detected by the crank angle sensor SN2. Then, the ECU 50 determines a target injection amount and a target injection timing of fuel to be injected from the fuel injection valve 15 into each cylinder 2, based on the above-described selection result on a combustion pattern (HCCI combustion or SI combustion), the specified engine load, and the specified engine rotation number; and controls the fuel injection valve 15 of each cylinder 2 in accordance with the determination. Specifically, fuel of the same amount as the target injection amount is injected from the fuel injection valve 15 at the same timing as the target injection timing. Further, the ECU 50 controls the throttle valve 30 in such a way that an opening angle of the throttle valve 30 coincides with a target opening angle to be set based on the above-described various conditions. Note that, when HCCI combustion is selected, an opening angle of the throttle valve 30 is kept to a high opening angle corresponding to a fully opened state, without depending on an engine load/rotation number.

Further, the ECU 50 determines whether it is necessary to perform internal EGR, which is an operation of letting burnt gas remain (flow back) in the cylinder 2, based on the above-described selection result on a combustion pattern, and an engine load/rotation number, determines a target EGR rate, which is a ratio of burnt gas to be introduced to the cylinder 2 by internal EGR; and controls the lift variable mechanism 13 and the opening/closing switching mechanism 14 in accordance with the determination. Specifically, when it is necessary to perform internal EGR, the ECU 50 drives the opening/closing switching mechanism 14 in such a way as to validate opening of the exhaust valve 12 in an intake stroke so as to perform internal EGR, and adjusts a lift amount/valve timing of the intake valve 11 by the lift variable mechanism 13 so as to introduce an amount of air (fresh air) and an amount of burnt gas associated with a target EGR rate into the cylinder 2.

(1-3) Control of Internal EGR Depending on Load

Next, a specific example of control relating to the internal EGR is described with reference to a control map of FIG. 2. Note that the control map is applied, when HCCI combustion is selected as a combustion pattern. When SI combustion is selected, since internal EGR is basically unnecessary, description on control in a case where SI combustion is selected is omitted.

An engine in the present embodiment is designed based on a premise that fuel having an octane number (e.g. 89 to 93 RON), which is equivalent to the octane number of regular gasoline commercially available in Japan is supplied. In order to perform appropriate HCCI combustion when such fuel is supplied, the ECU 50 sets, in accordance with the map illustrated in FIG. 2, a target EGR rate of internal EGR, namely, a target value of an EGR rate which is a ratio of burnt gas to be introduced by internal EGR with respect to a total amount of gas within the cylinder 2. The map illustrates a target EGR rate to be set depending on an engine load, when an engine rotation number has a fixed value (e.g. 1000 rpm). Note that, even when an engine rotation number is different, only a numerical value (%) of a target EGR rate, or a threshold value (X) of load differs, and a tendency itself remains the same.

Figures 2, 3:
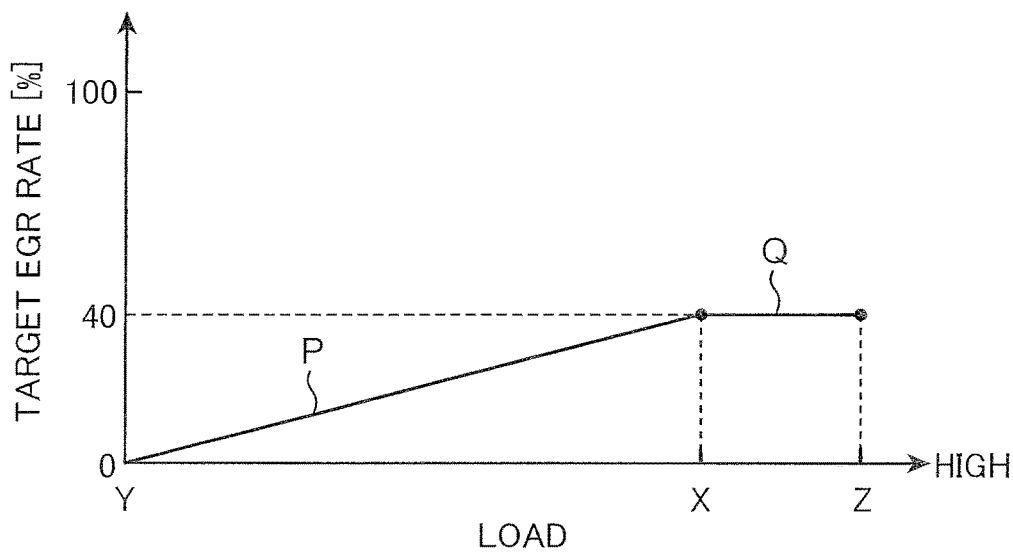
FIG. 2 is a diagram illustrating a map to be referred to in internal EGR control to be applied to the engine.
FIG. 3 is a table illustrating an engine specification and an operating condition for an experiment used in a study as a basis of the embodiment.

As illustrated in FIG. 2, a target EGR rate is set in such a way that the target EGR rate increases, as the load increases in a range from a lowest load Y associated with an idling operation to a threshold load X higher than the lowest load Y (see a zone P). Specifically, in the example of FIG. 2, a target EGR rate at a lowest load Y is set to 0%, and a target EGR rate at a threshold load X is set to 40%. In a range from a lowest load Y to a threshold load X, a target EGR rate is set to gradually increase in proportion to the load in a range from 0 to 40%. On the other hand, in a range from the threshold load X to a highest load Z, a target EGR rate is uniformly set to 40% (see a zone Q).

(2) Study as Basis of Present Invention

As described above, in the embodiment, internal EGR is performed during HCCI combustion, and an EGR rate of internal EGR is configured to gradually increase in proportion to the load in a load range except for high load (in a range from a lowest load Y to a threshold load X). The present invention as represented by the present embodiment is achieved, based on a study by the inventors of the present application, which is conducted in order to examine an influence of a difference in fuel component on HCCI combustion. In the following, a content of this study is described in detail.

(2-1) Experiment Method and Sample Fuels (a) Experiment Method

A table of FIG. 3 illustrates an engine specification and an operating condition used in an experiment of the present study. In order to facilitate HCCI combustion, an experimental engine in which a geometric compression ratio was set to 20, which was higher than an ordinary engine, was prepared, and the engine was operated with natural aspiration at 1000 rpm. Further, similarly to the embodiment, the experimental engine includes a fuel injection valve for directly injecting fuel into a cylinder, and a valve variable mechanism (corresponding to the lift variable mechanism 13 and the opening/closing switching mechanism 14 in the embodiment) capable of changing valve characteristics of an intake valve and an exhaust valve. The valve variable mechanism is hydraulically driven. By controlling the valve variable mechanism to change valve characteristics of an intake valve and an exhaust valve, an EGR rate of internal EGR was variably set among 0%, 40%, 60%, and 80%, and a compression start temperature of a cylinder was changed. Note that in evaluating an experiment, G/F (a gas-fuel ratio), which is a ratio between a total amount of working gas within a cylinder including fresh air and internal EGR gas, and a fuel amount, is used as an index for an operating condition. Further, in order to grasp a start timing of branched-chain reaction of fuel as an ignition timing of HCCI combustion, a point of time when a second-order differential of a heat generation rate became a maximum value was defined as an ignition timing.

(b) Sample Fuels

Figure 5:
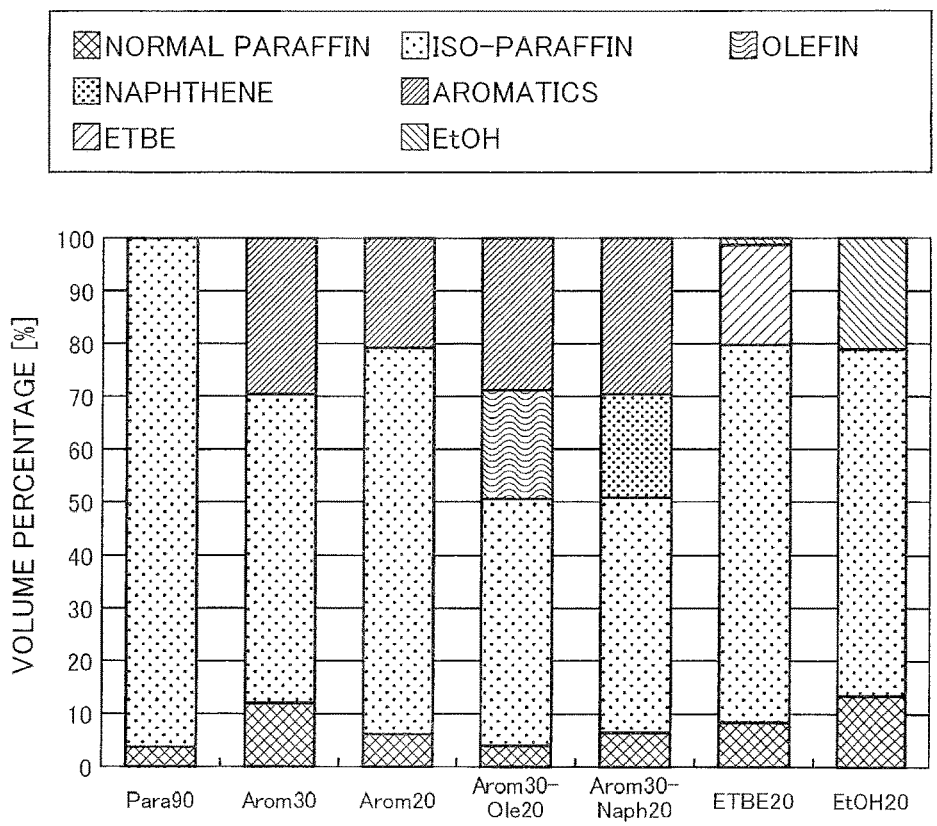
FIG. 5 is a graph illustrating volume percentages of components contained in each of the sample fuels.
Figure 6:
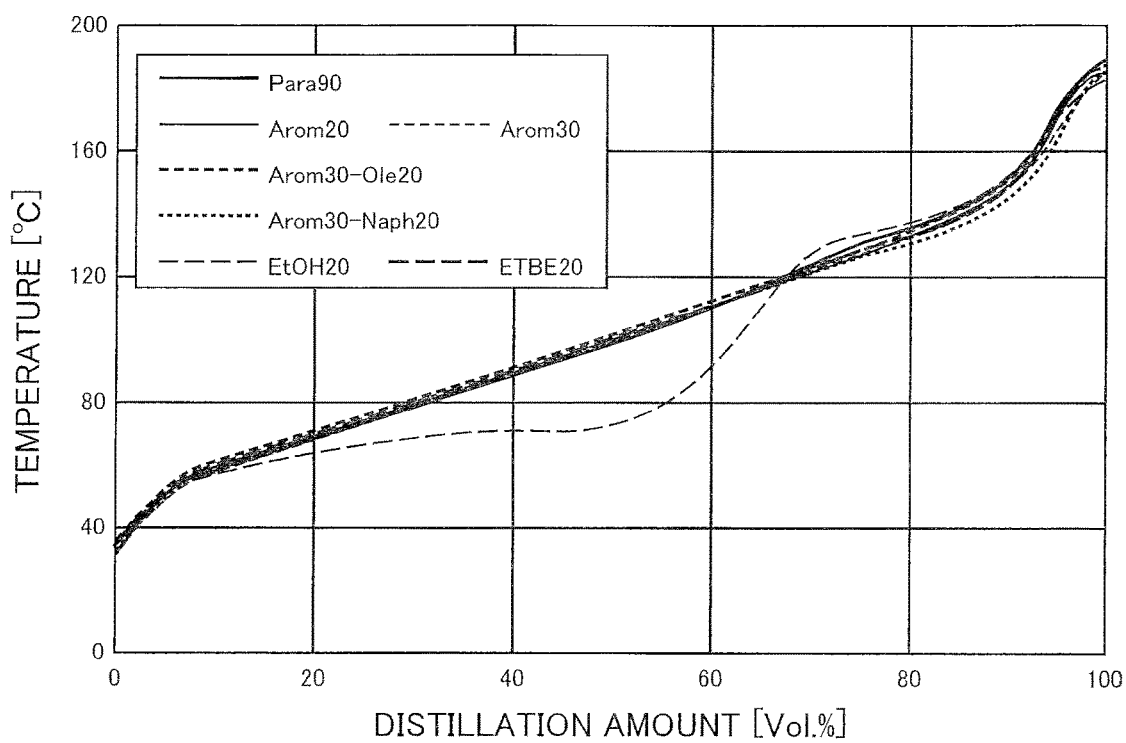
FIG. 6 is a graph illustrating distillation characteristics of each of the sample fuels.

As illustrated in FIG. 4, a plurality of sample fuels each having a substantially same octane number were prepared as fuels for use in an experiment. Specifically, seven types of sample fuels (Para90, Arom30, Arom20, Arom30-Ole20, Arom30-Naph20, ETBE20, and EtOH20), each of which had an octane number of about 90 RON, were prepared, while using RON being a commercially available gasoline standard as a reference. As illustrated in FIGS. 4 and 5, Para90 is a fuel composed only of paraffin-based hydrocarbon (normal paraffin and iso-paraffin), which is a base fuel. Arom30 is a fuel containing about 30 vol % aromatic-based hydrocarbon (where vol % is a volume fraction) in addition to paraffin-based hydrocarbon. Arom20 is a fuel containing about 20 vol % aromatic-based hydrocarbon in addition to paraffin-based hydrocarbon. Arom30-Ole20 is a fuel containing about 30 vol % aromatic-based hydrocarbon and about 20 vol % olefin-based hydrocarbon, in addition to paraffin-based hydrocarbon. Arom30-Naph20 is a fuel containing about 30 vol % aromatic-based hydrocarbon and about 20 vol % naphthene-based hydrocarbon, in addition to paraffin-based hydrocarbon. ETBE20 is a bio-based fuel containing about 20 vol % ETBE (ethyl tert-butyl ether) in addition to paraffin-based hydrocarbon. EtOH20 is a bio-based fuel containing about 20 vol % ethanol in addition to paraffin-based hydrocarbon. These seven types of sample fuels are prepared in such a way that an octane number of each of the sample fuels is about 90 RON. Further, in view of that an experimental engine is of a direct injection type, in order to prevent a difference in forming air-fuel mixture depending on fuel, sample fuels except for EtOH20 in which ethanol was mixed were prepared in such a way that kinematic viscosity, surface tension, and distillation characteristics (FIG. 6) associated with vaporization and atomization were equivalent among the sample fuels.

Further, although not illustrated in FIG. 4, for comparison, commercially available regular gasoline was also prepared, in addition to the above-described seven types of sample fuels, each of which had an octane number of about 90 RON. The octane number of regular gasoline was about 91 RON. In this way, the sample fuels in FIG. 4 (seven types) and regular gasoline are fuels, each of which has an equivalent RON.

(2-2) Experiment Result and Examination (a) Experiment Result

An operation by HCCI combustion was performed in a condition of four different EGR rates (0%, 40%, 60%, and 80%) with use of the above-described fuels (eight types in total). A result of the experiment is illustrated in FIGS. 7 and 8. Note that, in each case, G/F is set to 80.

Figure 7A:
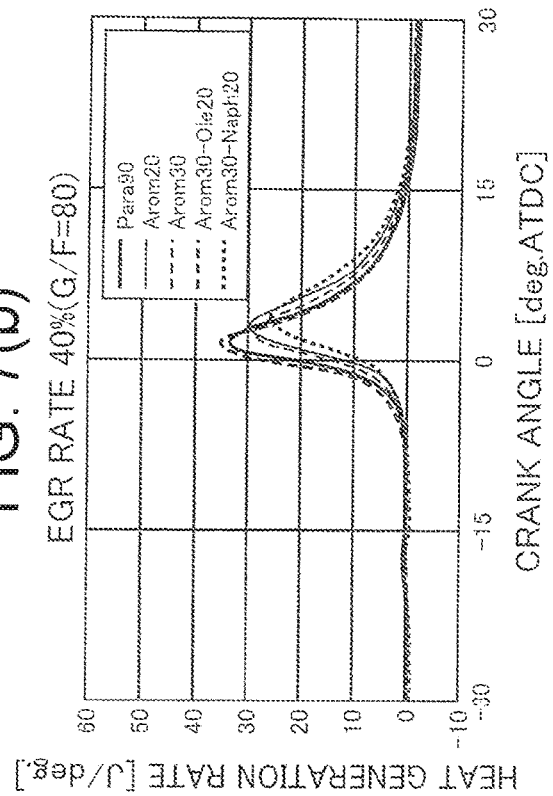
FIGS. 7(a) to 7(d) are graphs illustrating a heat generation rate for each EGR rate condition, when a plurality of types of fuels selected from among the sample fuels are respectively HCCI combusted.
Figure 7B:
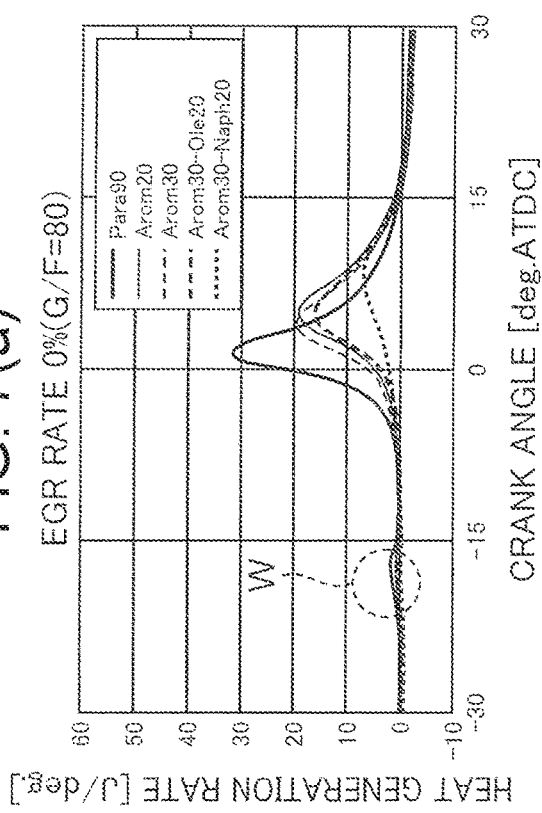
Figure 7C:
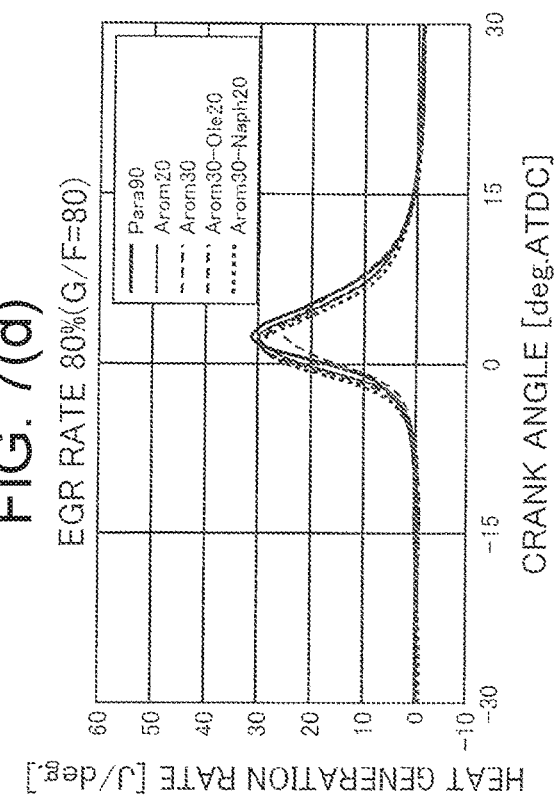
Figure 7D:
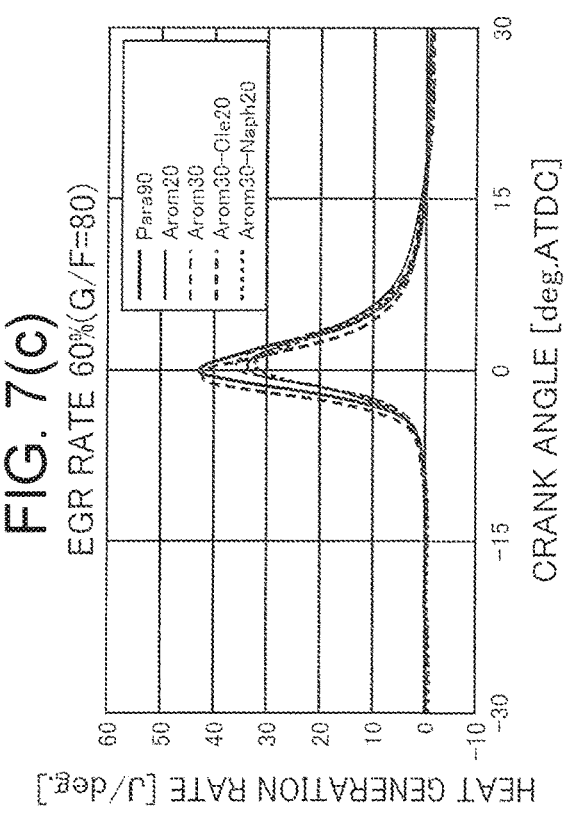

First, in order to examine an influence of each component, namely, aromatic-based component, olefin-based component, and naphthene-based component, a heat generation rate when each of the fuels, namely, Para90, Arom20, Arom30, Arom30-Ole20, and Arom30-Naph20 was used, was respectively measured, and FIGS. 7(a) to 7(d) were acquired. FIGS. 7(a), (b), (c), and (d) respectively illustrate cases where an EGR rate is set to 0%, 40%, 60%, and 80%. As illustrated in FIG. 7(a), when an EGR rate is 0%, ignition timings of the five types of fuels differ from one another, regardless that RON is substantially the same. For example, among the five types of fuels, an ignition timing of Para90 composed only of a paraffin-based component is the earliest, and an ignition timing of Arom30-Naph20 containing an aromatic-based component and a naphthene-based component is the latest. An ignition timing difference among these fuels decreases, as an EGR rate increases. When an EGR rate reaches 80% (FIG. 7(d)), an ignition timing difference by fuel is hardly recognized.

Next, in order to examine an influence of a representative component contained in a bio-based fuel, and an influence of a component of commercially available gasoline, a heat generation rate when each fuel, namely, EtOH20, ETBE20, and regular gasoline (91 RON) was used, was respectively measured, and FIGS. 8(a) to 8(d) were acquired. The FIGS. 8(a) to 8(d) respectively illustrate cases where an EGR rate is set to 0%, 40%, 60%, and 80%. For comparison, each graph also illustrates a heat generation rate when Para90 was used. As illustrated in FIG. 8(a), when an EGR rate is 0%, regular gasoline exhibited characteristics such that ignition is less likely to occur due to lack of cylinder temperature, and an ignition timing thereof is remarkably retarded. When an EGR rate is 40% (FIG. 8(b)), an ignition timing of regular gasoline becomes substantially coincident with an ignition timing of Para90. Further, similarly to the case of FIGS. 7(a) to 7(d), when an EGR rate reaches 80% (FIG. 8(d)), an ignition timing difference by fuel is hardly recognized.

Figure 9A:
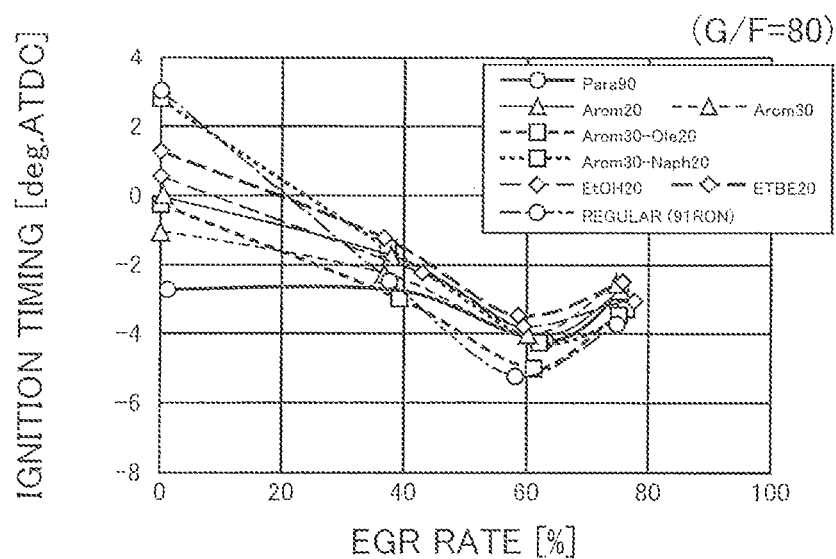
FIGS. 9(a) to 9(c) are graphs illustrating an ignition timing, indicated specific fuel consumption (ISFC), and a change rate of indicated mean effective pressure (IMEP) of each fuel acquired from combustion tests in FIGS. 7 and 8, in relation to an EGR rate.
Figure 9B:
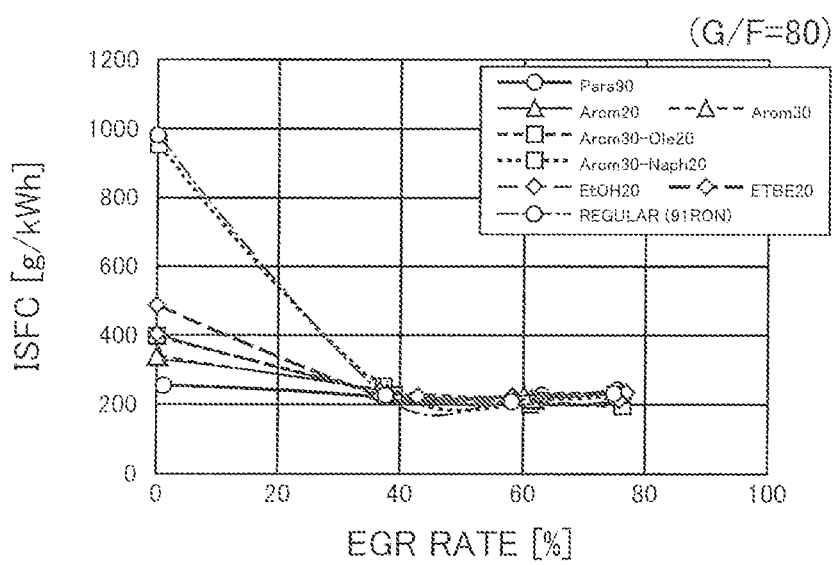
Figure 9C:
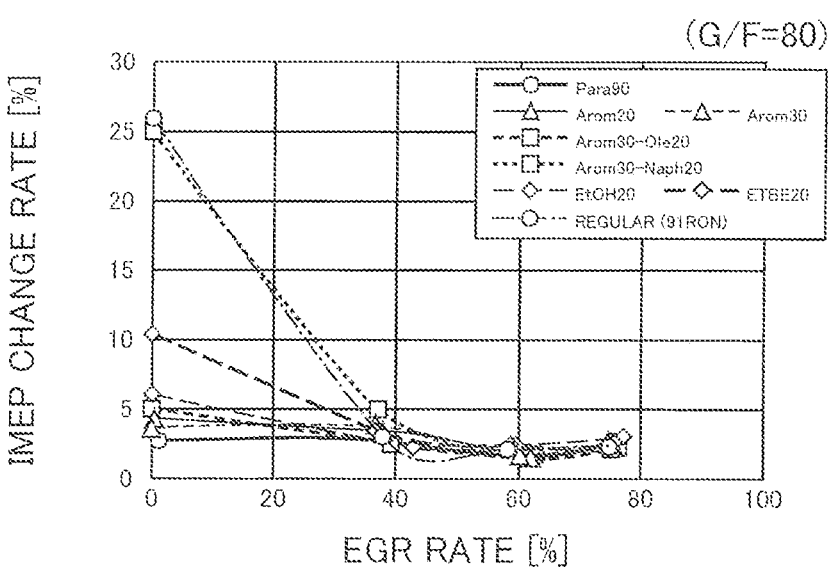

Ignition timings of all eight types of fuels used in the experiment, indicated specific fuel consumption (ISFC), and a change rate of indicated mean effective pressure (IMEP) were examined in relation to an EGR rate, based on a result of the above-described combustion test (FIGS. 7(a) to 7(d) and 8(a) to 7(d)), and FIGS. 9(a) to 9(c) were respectively acquired.

As illustrated in FIG. 9(a), in a condition that an EGR rate is 0%, an ignition timing differs by about 6 deg maximally among the eight types of fuels. As illustrated in FIG. 7(a) and FIG. 8(a), it is conceived that such a large ignition timing variation occurs due to a low-temperature oxidation reaction during a compression stroke (see a portion indicated by the symbol W surrounded by a broken line). Note that a low-temperature oxidation reaction is a slow oxidation reaction that occurs in a relatively low-temperature condition before occurrence of a high-temperature oxidation reaction, which is a reaction such that fuel vigorously oxidizes (reaction accompanying generation of flame). Since a low-temperature oxidation reaction is a slow reaction such that a molecular structure of fuel is gradually destroyed, a low-temperature oxidation reaction is likely to be affected by a difference in fuel component (molecular structure). It is conceived that occurrence of such a low-temperature oxidation reaction beforehand may affect a high-temperature oxidation reaction, and cause a large ignition timing difference.

On the other hand, when an EGR rate is raised up to 40%, ignition timings of the eight types of fuels are advanced as a whole, and an ignition timing difference among the eight types of fuels falls within about 2 deg. This tendency is similarly observed also when an EGR rate is further raised. In a condition that an EGR rate is 80%, an ignition timing difference is narrowed to less than 2 deg. In other words, it is clear that by setting an EGR rate to 40% or more among the eight types of fuels, each of which has an equivalent RON, it is possible to substantially eliminate an influence of a difference in fuel component on an ignition timing. It is conceived that this is because a low-temperature oxidation reaction is sufficiently suppressed by an influence of a high temperature state within a cylinder by internal EGR. Note that, in FIG. 9(a), when an EGR rate is raised from 60% to 80%, ignition timings are retarded as a whole. This is because a specific heat ratio of gas within a cylinder is lowered accompanied by an increase in EGR rate, and a compression end temperature is lowered.

Further, ISFC and an IMEP change rate (FIGS. 9(b) and (c)) are similar to a change in ignition timing. That is, when an EGR rate is equal to or higher than 40%, an influence by a fuel component is hardly recognized.

(b) Influence by G/F

In order to clarify an influence due to a difference in G/F, an operation by HCCI combustion was performed in various G/F conditions by using seven types of fuels (Para90, Arom30, Arom20, Arom30-Ole20, Arom30-Naph20, ETBE20, and EtOH20), each of which had an octane number of about 90 RON. Then, an ignition timing difference (ΔIg) with use of Para90 as a reference was examined, and an isoline graph illustrated in FIG. 10 was acquired. Note that, since a supply amount of fuel into a cylinder increases, as G/F decreases, small G/F means high engine load, and a large G/F means low engine load. Further, in a condition that an EGR rate is 80, when G/F reached 80, an excess air factor X reached 1. Therefore, the engine could not be operated on a high load side than the load corresponding to G/F=80. In view of the above, in FIG. 10, an operation disable region (a region indicated as "Over Rich") where X is smaller than 1 is illustrated blank. This definition is also applied to the graphs of FIGS. 11, 13, and 14 to be described later.

Figure 10:
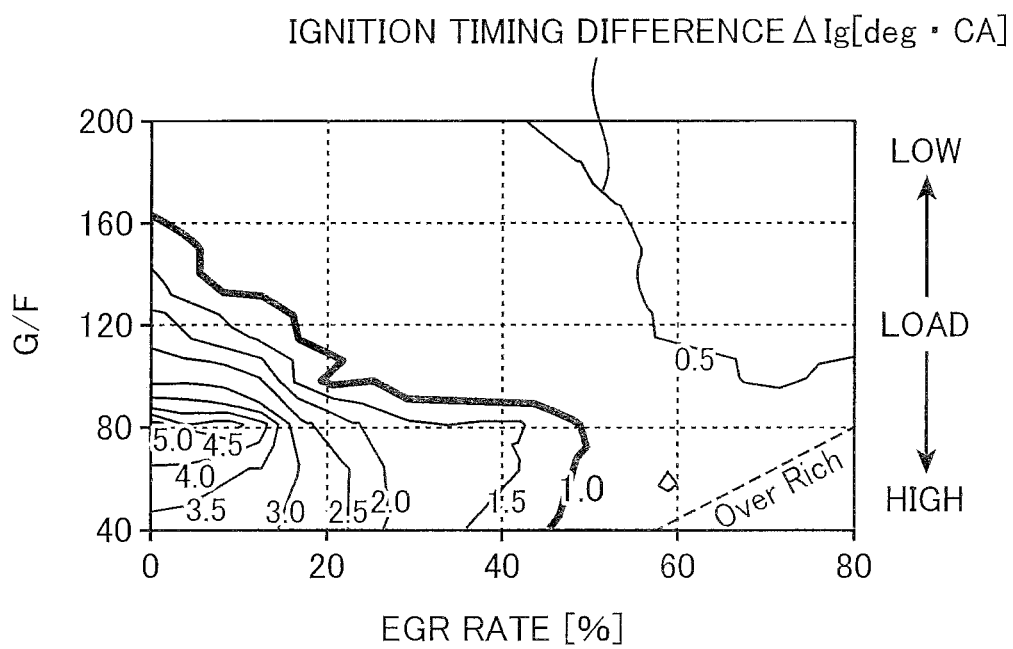
FIG. 10 is an isoline graph illustrating how an ignition timing difference among 90 RON fuels changes depending on G/F and an EGR rate.

As illustrated in FIG. 10, in a low load operating condition where G/F is equal to or larger than 160, an ignition timing difference lies within ±1 deg without depending on an EGR rate. It is clear that an influence due to a difference in fuel component is small. However, when G/F becomes smaller than 160 (in other words, load increases), a region where an ignition timing difference becomes larger than ±1 deg (in other words, a region where an influence due to a difference in fuel component is large) starts to appear. As is understood from an isoline representing that an ignition timing difference is "1.0", in order to suppress an ignition timing difference within ±1 deg, it is necessary to set an EGR rate to 20% or more in a condition that G/F is 100, and it is necessary to set an EGR rate to 40% or more in a condition that G/F is 80 or less.

Figure 11:
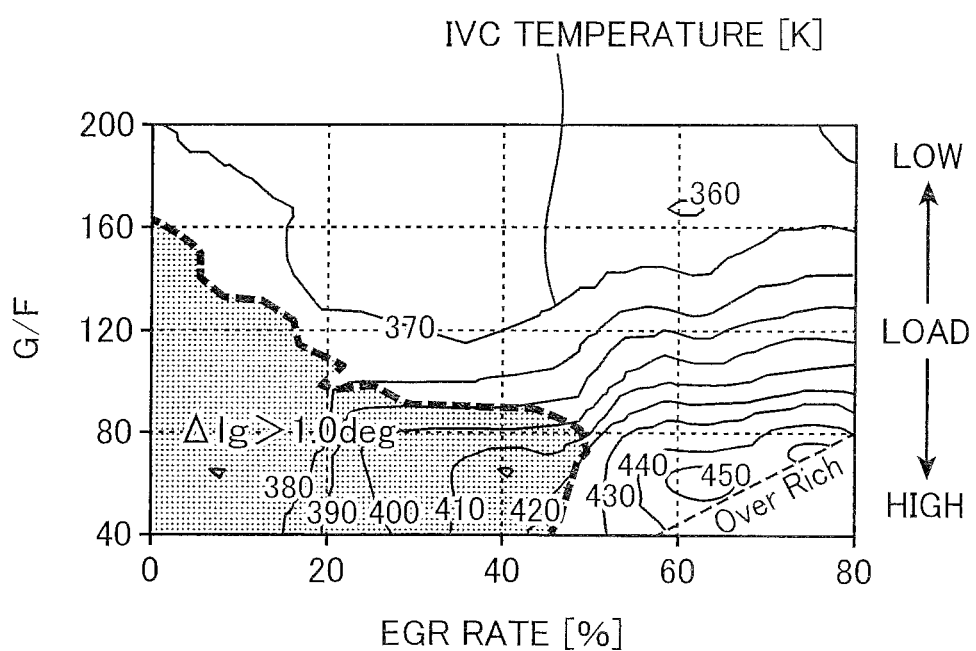
FIG. 11 is a graph illustrating that an isoline of an IVC temperature that changes depending on G/F and an EGR rate overlaps the result of FIG. 10.

In order to comprehend a mechanism by which characteristics as illustrated in FIG. 10 appear, a cylinder temperature at an intake valve close timing (IVC) was examined, and an isoline graph illustrated in FIG. 11 was acquired. Note that, the graph of FIG. 11 also illustrates an isoline representing that an ignition timing difference is ±1 deg, which is acquired from FIG. 10. As illustrated in FIG. 11, it is clear that an operating condition in which an ignition timing difference (ΔIg) becomes larger than ±1 deg is an operating condition in which G/F is small (in other words, a fuel concentration is high), and a cylinder temperature is low. This implies that an ignition timing difference is generated by an influence of a low-temperature oxidation reaction.

(c) Influence by Fuel Component

In order to examine an influence of a fuel component on an ignition timing of HCCI combustion, an analysis using an octane index (OI) was performed. Specifically, by identifying a coefficient K illustrated in the following formula (1) for each operating condition, a degree of dependence of an ignition timing on RON and MON was examined.

$$OI=(1-K)\times RON + K\times MON \tag{1}$$

As is well-known, RON denotes a research octane number, and MON denotes a motor octane number.

Both of the octane numbers are indexes each indicating ignitability (antiknock property) of fuel, and they are different in terms of measurement conditions. Due to the measurement condition difference, it can be said that RON is an index representing ignitability in a relatively low temperature condition, and MON is an index representing ignitability in a relatively high temperature condition. More specifically, RON is an index representing fuel ignitability in a combustion condition accompanying a low-temperature oxidation reaction, and MON is an index representing fuel ignitability in a combustion condition without accompanying a low-temperature oxidation reaction.

A coefficient K in the above-described Eq. (1) was identified by a least square method for each EGR rate, based on a change in ignition timing of each fuel illustrated in FIG. 9(a), specifically, a change in ignition timing of each fuel, when G/F was fixed to 80 and an EGR rate was changed. Thus, the graph of FIG. 12 was acquired. Note that, in identifying a coefficient K, ignition timings of not only eight types of fuels used in measuring ignition timings of FIG. 9(a), but also another sample fuel prepared in such a way that the octane number became 80 RON, and an ignition timing of commercially available high-octane gasoline (100 RON) were measured, and data on the measurement were also used.

Herein, identifying a coefficient K for each operating condition means examining which one of RON and MON has a higher correlation to an ignition timing for each operating condition. Specifically, when K identified in a certain operating condition is large, it can be said that the operating condition is an operating condition in which an ignition timing is likely to be affected by a MON value (in other words, a correlation between an ignition timing and MON is high). This means that the operating condition is an operating condition in which an influence of a low-temperature oxidation reaction is small. On the other hand, when K identified in a certain operating condition is small, it can be said that the operating condition is an operating condition in which an ignition timing is likely to be affected by an RON value (in other words, a correlation between an ignition timing and RON is high). This means that the operating condition is an operating condition in which an influence of a low-temperature oxidation reaction is large. Note that, when the coefficient K is 1, since Eq. (1) becomes OI=MON, an octane index is MON itself. Further, when the coefficient K is 0, since Eq. (1) becomes OI=MON, an octane index is RON itself.

Figure 12:
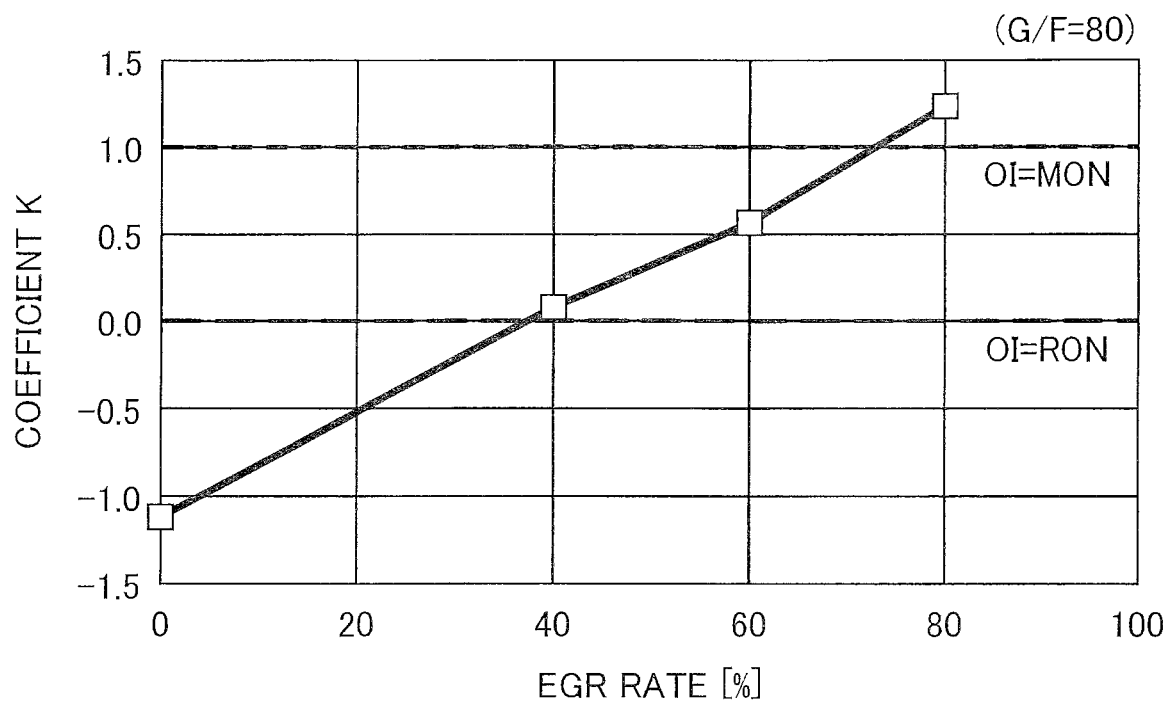
FIG. 12 is a graph illustrating a coefficient K of an octane index in relation to an EGR rate.

FIG. 12 illustrates that a coefficient K is larger than 1 in a condition that an EGR rate is 80%; a coefficient K is substantially equal to zero in a condition that an EGR rate is 40%; and a coefficient K decreases proportionally, as an EGR rate decreases. This implies that an influence of a low-temperature oxidation reaction is negligible in a condition that an EGR rate is 80%, and an influence of a low-temperature oxidation reaction gradually increases, as an EGR rate becomes lower than 80%. In other words, a change in coefficient K illustrated in FIG. 12 well describes characteristics, namely, how a fuel component affects an ignition timing. Note that, in FIG. 10, an ignition timing difference is about 1±deg or less in almost all G/F cases in a range where an EGR rate is 40% or more. The above insight and the result of FIG. 12 reveal that the coefficient K is required to be 0 or more in order to sufficiently suppress an influence of a fuel component in HCCI combustion. Conversely, when the coefficient K is smaller than 0, an influence of a low-temperature oxidation reaction significantly increases, and an ignition timing of HCCI combustion may greatly vary due to a difference in fuel component. Therefore, in order to perform appropriate HCCI combustion while avoiding such a phenomenon, it is important to employ an operating condition in which a coefficient K of an octane index becomes 0 or more, in other words, an operating condition in which an influence of a low-temperature oxidation reaction is relatively small.

(2-3) Guideline Study on HCCI Combustion Control (a) Study on Various Operation Constraints It is known that, when HCCI combustion is performed, a number of constraints to be considered is large, as compared with conventional SI combustion (spark ignition combustion). For example, in a high load range of an engine, large combustion noise may occur due to rapid progress of combustion. Therefore, there is a constraint that HCCI combustion is required to be controlled so as not to increase combustion noise in a high load range. In view of the above, a guideline on combustion control for minimizing an influence by a fuel component was studied, taking into consideration the above constraint.

Figure 13A:
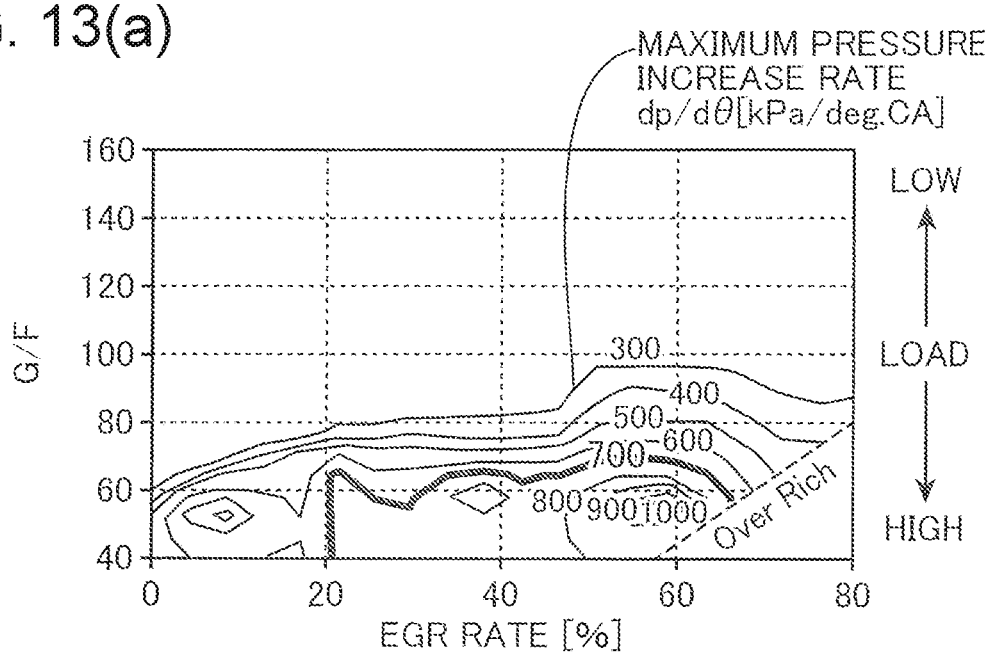
FIGS. 13(a) and 13(b) are isoline graphs of a maximum pressure increase rate (dp/dθ), and a coefficient K of an octane index acquired from a combustion test using regular gasoline.
Figure 13B:
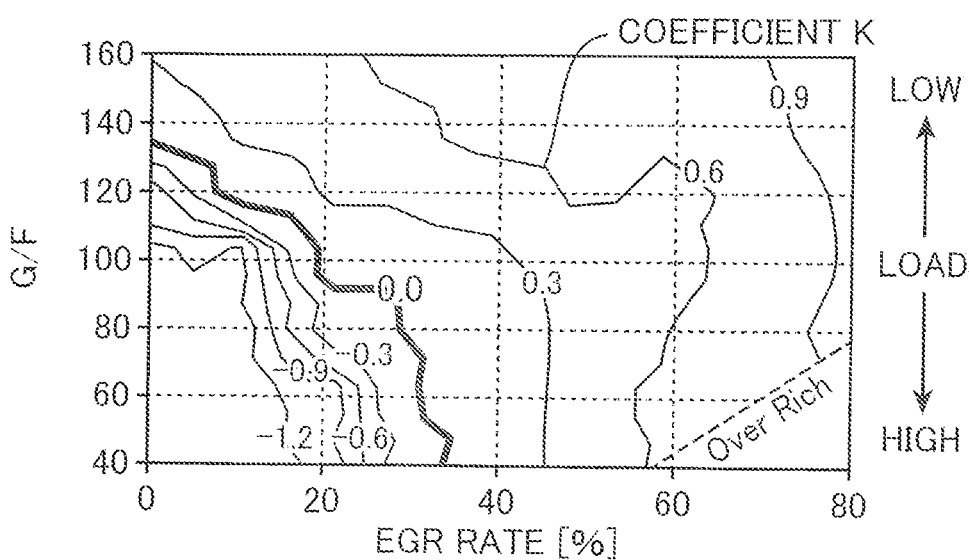

Combustion noise when HCCI combustion was performed by using regular gasoline (91 RON) was examined, and FIG. 13(a) was acquired. Specifically, FIG. 13(a) is an isoline graph indicating a change in maximum pressure increase rate (dp/de) depending on an EGR rate and G/F. Further, as FIG. 13(b), an isoline graph indicating a change in coefficient K of an octane index depending on an EGR rate and G/F was prepared. Note that a maximum pressure increase rate (dp/dθ) is a maximum value of an increase rate of a cylinder pressure that changes depending on a crank angle, and is a parameter serving as an index of combustion noise.

In terms of suppressing combustion noise, while weakening an influence of a fuel component, herein, it is assumed that an upper limit of a maximum pressure increase rate is 700 kPa/deg (corresponding to 5 MPa/sec), and a lower limit of a coefficient K is 0. As illustrated in the graph (a), although a maximum pressure increase rate exceeds an upper limit (700 kPa/deg) in a part of a region on a high load side, since an ignition timing is retarded when an EGR rate is low, a maximum pressure increase rate is suppressed to an upper limit or lower in any of load ranges where an EGR rate is low (lower than about 20%). As illustrated in the graph (b), the coefficient K falls below a lower limit (0) in a part of a region where an EGR rate is low and the load is high. This is because when an EGR rate is low and the load is high, high-concentration fuel is present in a low-temperature cylinder, and combustion is likely to be affected by a low-temperature oxidation reaction.

(b) Combustion Control Guideline Considering Various Operation Constraints

Figure 14:
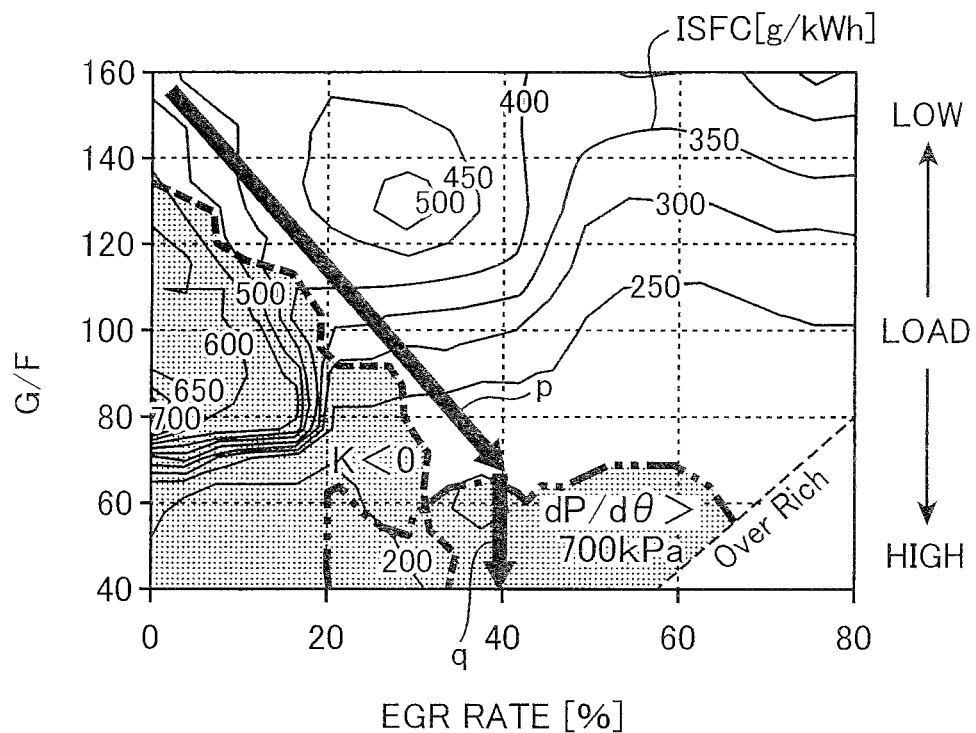
FIG. 14 is a graph illustrating that an isoline of indicated specific fuel consumption (ISFC) overlaps the result of FIG. 13, and is a diagram for describing a control guideline for performing appropriate HCCI combustion.

The graph of FIG. 14 was acquired by overlapping an allowable value of each of the maximum pressure increase rate (dp/de) and the coefficient K illustrated in FIGS. 13(a) and (b) on an isoline of indicated specific fuel consumption (ISFC). A control guideline for performing appropriate HCCI combustion from a low load to a high load, while avoiding an increase in combustion noise is studied by using the graph of FIG. 14. Note that FIG. 14 illustrates a region where each of a maximum pressure increase rate and a coefficient K falls outside an allowable range, in other words, a region where dp/dθ>700 kPa, and a region where K<0 respectively in gray. Hereinafter, these regions are referred to as NG regions.

Herein, an NG region on the maximum pressure increase rate (dp/dθ) corresponds to a case where regular gasoline is used. As already described, it is clear that, as far as the octane number is equivalent, similar ignition characteristics are acquired, even when fuel having a different fuel component is used, by generating an operating condition in which the coefficient K becomes 0 or more. Therefore, it is conceived that, when an octane number of fuel is guaranteed to be equivalent to that of regular gasoline (91 RON), low-noise and stable HCC combustion can be performed without depending on a fuel component by adjusting an operating condition in such a way that NG regions on a maximum pressure increase rate and a coefficient K are avoided.

In view of the above, controlling an EGR rate along arrows p and q illustrated in FIG. 14 is proposed. Specifically, first, as illustrated by the arrow p, an EGR rate is increased, as the load increases (as G/F decreases) in a region where the load is low as compared with the NG region on the maximum pressure increase rate (a region where $dp/d\theta > 700$ kPa). An EGR rate is set to a value that passes a vicinity on the outer side of the NG region on the coefficient K (a region where K<0), and is gradually increased depending on the load from 0% up to 40%. As illustrated by the arrow q, when the load approaches a value corresponding to a boundary of the NG region on the maximum pressure increase rate, the load is increased, while maintaining the EGR rate to a fixed value (40%) so as not to increase the EGR rate any more.

Since the arrow p is deviated from the NG regions on the maximum pressure increase rate and the coefficient K, it is conceived that performing low-noise HCCI combustion without depending on a fuel component is enabled by controlling an EGR rate along the arrow p. On the other hand, since the arrow q is present within the NG region on the maximum pressure increase rate, it is necessary to provide another measure for suppressing combustion noise. For example, a measure such that an ignition timing is intentionally retarded by retarding a fuel injection timing as compared with a normal injection operation may be provided.

(3) Description on Operations and Advantageous Effects of Embodiment

Next, operations and advantageous effects of the embodiment described with reference to FIGS. 1 and 2 are described, based on the above-described result on a study by the inventors of the present application, In the embodiment, when an operation by HCCI combustion is performed, internal EGR control is performed along a target EGR rate defined in the control map illustrated in FIG. 2. Setting an EGR rate in accordance with the control map of FIG. 2 can be regarded as control that conforms to a control guideline of FIG. 14, which was acquired by the above-described study. Specifically, the zone P in the control map of FIG. 2 corresponds to setting an EGR rate along the arrow p in FIG. 14, and the zone Q in the control map corresponds to setting an EGR rate along the arrow q in FIG. 14. The embodiment in which an EGR rate is set in the above-described manner is advantageous in suppressing an ignition timing variation without depending on a fuel component, when an operation by HCCI combustion is performed.

Specifically, in the embodiment, in a load range from a lowest load Y to a threshold load X, an EGR rate is set to increase, as the load increases (in other words, G/F decreases). Thus, since a cylinder temperature increases in a condition that a fuel concentration of the cylinder 2 increases, it is possible to suppress occurrence of a low-temperature oxidation reaction and thereby to suppress a variation in fuel ignition timing depending on a fuel component. For example, if a cylinder temperature is low in a condition that the load is high and a fuel concentration is high, a low-temperature oxidation reaction is likely to occur. Then, a start timing of a high-temperature oxidation reaction, in other words, a fuel ignition timing may greatly vary by a fuel component due to an influence of the low-temperature oxidation reaction. However, in the embodiment, since an EGR rate is increased toward a high load side where a fuel concentration increases, an environment such that a low-temperature oxidation reaction does not occur (or is less likely to occur) is created by raising the temperature of the cylinder 2 by a large amount of internal EGR. Consequently, it is possible to sufficiently suppress an influence of a difference in fuel component on an ignition timing. Thus, it is possible to ignite fuel at a substantially same timing without depending on a fuel component, and it is possible to perform appropriate HCCI combustion while allowing use of various types of fuels having different components.

Further, in the embodiment, by setting an EGR rate to a value as illustrated in the control map of FIG. 2 in a load range from a lowest load Y to a threshold load X, it is possible to suppress each of a coefficient K of an octane index and a maximum pressure increase rate $(dp/d\theta)$ within an allowable range, as illustrated by the arrow p in the graph of FIG. 14. Thus, it is possible to suppress an ignition timing variation due to a difference in fuel component, and an increase in combustion noise, and it is possible to perform appropriate HCCI combustion without depending on a fuel component.

Figure 15:
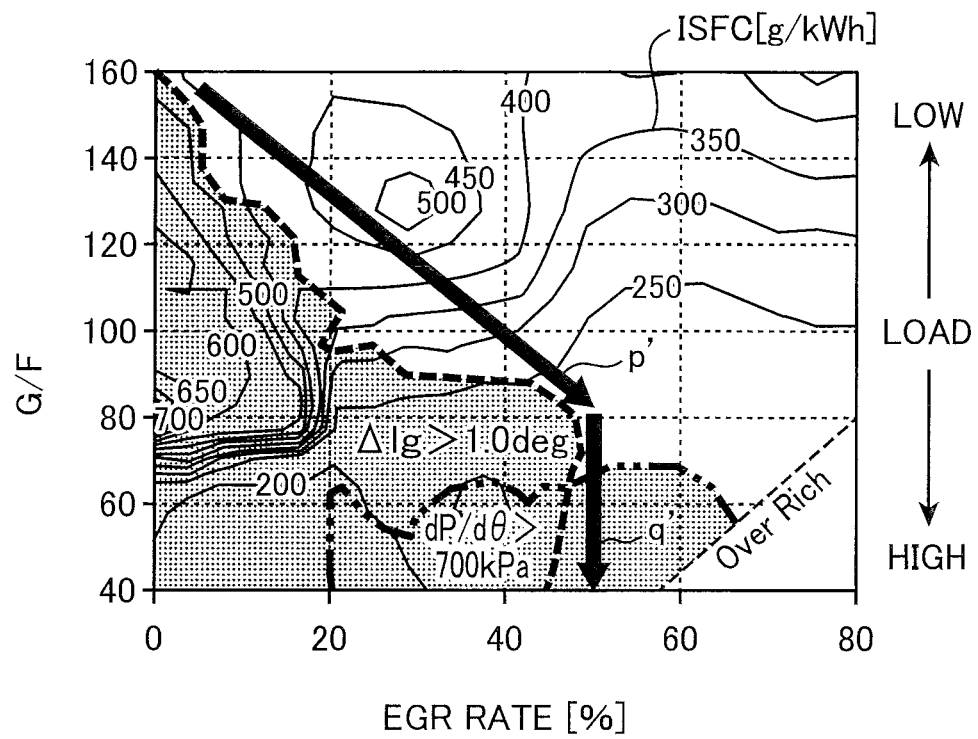
FIG. 15 is a diagram corresponding to FIG. 14 for describing a modification of the embodiment.

In the embodiment, an EGR rate is set in such a way that a coefficient K of an octane index is set to be equal to or larger than 0 in all load ranges of the engine. Alternatively, as illustrated by arrows p' and q' in FIG. 15, an EGR rate may be set in such a way that an ignition timing difference ($\Delta$Ig) avoids a region exceeding ±1 deg. In this configuration, since $\Delta$Ig is suppressed to be equal to or lower than ±1 deg, it is also possible to suppress an ignition timing variation due to a difference in fuel component. Note that a boundary of an NG region ($\Delta$Ig>1.0 deg) on an ignition timing difference in FIG. 15 is acquired by overlapping an isoline representing that $\Delta$Ig=1.0, which is illustrated in FIG. 10.

Further, in the embodiment, internal EGR is performed by opening the exhaust valve 12 in an intake stroke (accompanied with this operation, burnt gas is caused to flow back into the cylinder 2). Alternatively, internal EGR may be performed by providing a negative overlap period during which both of an intake valve and an exhaust valve are closed. Further alternatively, in place of internal EGR, external EGR of refluxing burnt gas through an EGR passage connecting an intake passage and an exhaust passage by a short distance may be performed. In this case, however, an EGR cooler for cooling burnt gas is not disposed in an EGR passage. This is proposed in order to reflux burnt gas (exhaust gas) discharged from a cylinder 2 to the cylinder 2 in a high temperature state through a short-distance EGR passage in which an EGR cooler is not disposed. In any case, as far as EGR (high-temperature EGR) of introducing burnt gas into a cylinder in a high temperature state is performed, various modifications are applicable to an EGR device of the present invention.

(4) Overview of Embodiment

The following is an overview of the embodiment.

A compression ignition gasoline engine according to the embodiment includes: a cylinder for accommodating a piston to be reciprocally movable; a fuel injection valve for injecting fuel containing gasoline as a main component into the cylinder; an EGR device operative to perform high-temperature EGR of introducing burnt gas generated in the cylinder into the cylinder at a high temperature; and a combustion control unit for controlling the fuel injection valve and the EGR device in such a way that HCCI combustion in which fuel injected from the fuel injection valve self-ignites within the cylinder occurs. The combustion control unit controls the EGR device in such a way that, in at least a partial load operating range in which HCCI combustion is performed, an EGR rate increases, as compared with a low load condition, in a high load condition in which G/F being a ratio between a total amount of gas and a fuel amount within the cylinder decreases.

According to this configuration, when an operation by HCCI combustion is performed, an EGR rate increases in a high load condition in which G/F decreases (in other words, a fuel concentration increases), as compared with a low load condition. Therefore, it is possible to suppress occurrence of a low-temperature oxidation reaction by temperature rise in the cylinder accompanied by an increase in EGR rate, and it is possible to suppress a variation in fuel ignition timing depending on a fuel component. For example, if a cylinder temperature is low in a condition that the load is high and a fuel concentration is high, a low-temperature oxidation reaction is likely to occur. Then, a start timing of a high-temperature oxidation reaction, in other word, a fuel ignition timing may greatly vary by a fuel component due to an influence of the low-temperature oxidation reaction. However, in the above-described configuration, since an EGR rate is increased in a high load condition in which a fuel concentration increases, as compared with a low load condition, an environment such that a low-temperature oxidation reaction does not occur (or is less likely to occur) is created by raising the temperature of the cylinder by a large amount of internal EGR. Consequently, it is possible to sufficiently suppress an influence of a difference in fuel component on an ignition timing. Thus, it is possible to ignite fuel at a substantially same timing without depending on a fuel component, and it is possible to perform appropriate HCCI combustion while allowing use of various types of fuels having different components.

Preferably, the combustion control unit may control the EGR device in such a way that an EGR rate at which a coefficient K of an octane index expressed by the following Eq. (1) becomes equal to or larger than a predetermined value is achieved.

$$OI = (1-K) \times RON + K \times MON \quad (1)$$

where RON denotes a research octane number, and MON denotes a motor octane number.

In this way, when an EGR rate is set in such a way that the coefficient K of the octane index is relatively increased, it is possible to create an operating condition in which a correlation between an ignition timing and RON is low and an influence of the low-temperature oxidation reaction is small. Thus, it is possible to advantageously suppress an ignition timing variation due to a difference in fuel component.

Alternatively, as another aspect providing similar advantageous effects, the combustion control unit may control the EGR device in such a way that an EGR rate at which an ignition timing variation due to a difference in fuel component is suppressed to a predetermined value or smaller is achieved.

Preferably, a geometric compression ratio of the cylinder may be set to be not smaller than 18 but not larger than 22.

According to this configuration, it is possible to appropriately create a high-temperature and high-pressure cylinder environment capable of performing HCCI combustion.

Preferably, the EGR device may be a valve variable mechanism operative to perform internal EGR of letting burnt gas generated in the cylinder remain in the cylinder, as the high-temperature EGR.

According to this configuration, it is possible to securely raise a cylinder temperature by letting high-temperature burnt gas remain in the cylinder.

The invention claimed is:
1. A compression ignition gasoline engine comprising:
a cylinder for accommodating a piston to be reciprocally movable;
a fuel injection valve for injecting fuel containing gasoline as a main component into the cylinder;
an EGR device operative to perform high-temperature EGR of introducing burnt gas generated in the cylinder into the cylinder at a high temperature; and
a combustion control unit for controlling the fuel injection valve and the EGR device in such a way that HCCI combustion in which fuel injected from the fuel injection valve self-ignites within the cylinder occurs, wherein
the combustion control unit controls the EGR device in such a way that, in at least a partial load operating range in which HCCI combustion is performed, an EGR rate increases, as compared with a low load condition, in a high load condition in which G/F being a ratio between a total amount of gas and a fuel amount within the cylinder decreases, and
the combustion control unit controls the EGR device in such a way that an EGR rate at which a coefficient K of an octane index expressed by the following Eq. (1) becomes equal to or larger than a predetermined value is achieved:

$$OI = (1-K) \times RON + K \times MON \quad (1)$$

where RON denotes a research octane number, and MON denotes a motor octane number.

2. A compression ignition gasoline engine comprising:
a cylinder for accommodating a piston to be reciprocally movable;
a fuel injection valve for injecting fuel containing gasoline as a main component into the cylinder;
an EGR device operative to perform high-temperature EGR of introducing burnt gas generated in the cylinder into the cylinder at a high temperature; and
a combustion control unit for controlling the fuel injection valve and the EGR device in such a way that HCCI combustion in which fuel injected from the fuel injection valve self-ignites within the cylinder occurs, wherein
the combustion control unit controls the EGR device in such a way that, in at least a partial load operating range in which HCCI combustion is performed, an EGR rate increases, as compared with a low load condition, in a high load condition in which G/F being a ratio between a total amount of gas and a fuel amount within the cylinder decreases, and
a geometric compression ratio of the cylinder is set to be not smaller than 18 but not larger than 22.

3. A compression ignition gasoline engine comprising:
a cylinder for accommodating a piston to be reciprocally movable;
a fuel injection valve for injecting fuel containing gasoline as a main component into the cylinder;
an EGR device operative to perform high-temperature EGR of introducing burnt gas generated in the cylinder into the cylinder at a high temperature; and
a combustion control unit for controlling the fuel injection valve and the EGR device in such a way that HCCI combustion in which fuel injected from the fuel injection valve self-ignites within the cylinder occurs, wherein
the combustion control unit controls the EGR device in such a way that, in at least a partial load operating range in which HCCI combustion is performed, an EGR rate increases, as compared with a low load condition, in a high load condition in which G/F being a ratio between a total amount of gas and a fuel amount within the cylinder decreases, and the EGR device is a valve variable mechanism operative to perform internal EGR of letting burnt gas generated in the cylinder remain in the cylinder, as the high-temperature EGR.

\* \* \* \* \*